(12) United States Patent
Hirschhorn

(10) Patent No.: US 7,971,840 B2
(45) Date of Patent: Jul. 5, 2011

(54) ADJUSTABLE SUPPORT ARM FOR AUDIO VISUAL DEVICE

(76) Inventor: Bruce D. Hirschhorn, Boonton, NJ (US)

( * ) Notice: Subject to any disclaimer, the term of this patent is extended or adjusted under 35 U.S.C. 154(b) by 448 days.

(21) Appl. No.: 12/105,452

(22) Filed: Apr. 18, 2008

(65) Prior Publication Data
US 2008/0197256 A1   Aug. 21, 2008

Related U.S. Application Data

(62) Division of application No. 10/457,158, filed on Jun. 9, 2003, now Pat. No. 7,369,672.

(60) Provisional application No. 60/391,281, filed on Jun. 24, 2002.

(51) Int. Cl.
*A47F 5/00* (2006.01)

(52) U.S. Cl. ........... 248/281.11; 248/278.1; 248/280.11; 248/123.11; 403/362; 361/679.06; 361/679.07; 361/679.21

(58) Field of Classification Search .............. 248/158, 248/274.1, 278.1, 276.1, 280.11, 281.11, 248/284.1, 123.11, 123.2, 162.1; 403/362; 361/679.06, 679.07, 679.21
See application file for complete search history.

(56) References Cited

U.S. PATENT DOCUMENTS

| | | | |
|---|---|---|---|
| 2,504,501 A * | 4/1950 | Conn | 403/354 |
| 2,629,616 A * | 2/1953 | McVey | 403/362 |
| 3,008,259 A * | 11/1961 | Zornes | 43/43.12 |
| 3,243,497 A * | 3/1966 | Kendall et al. | 174/61 |
| 3,662,981 A * | 5/1972 | Hogrebe | 248/278.1 |
| 4,183,489 A * | 1/1980 | Copher et al. | 248/278.1 |
| 4,213,591 A * | 7/1980 | Jaakkola | 248/281.11 |
| 4,280,172 A * | 7/1981 | Krogsrud | 362/269 |
| 4,568,052 A * | 2/1986 | Solomon et al. | 248/281.11 |
| 4,770,384 A * | 9/1988 | Kuwazima et al. | 248/281.11 |
| 4,892,278 A * | 1/1990 | Huang | 362/427 |
| 5,092,552 A * | 3/1992 | Dayton et al. | 248/280.11 |
| 5,154,390 A * | 10/1992 | Bain et al. | 248/447.2 |
| 5,333,103 A * | 7/1994 | Cvek | 362/413 |
| 6,027,233 A * | 2/2000 | Chen | 362/402 |
| 6,367,756 B1 * | 4/2002 | Wang | 248/278.1 |
| 6,378,829 B1 * | 4/2002 | Strater et al. | 248/276.1 |
| 6,769,657 B1 * | 8/2004 | Huang | 248/278.1 |
| 6,856,094 B2 * | 2/2005 | Sherman | 315/57 |
| 7,037,026 B2 * | 5/2006 | Ostling et al. | 403/371 |
| 7,207,537 B2 * | 4/2007 | Hung | 248/284.1 |
| 7,338,022 B2 * | 3/2008 | Hung et al. | 248/278.1 |
| 7,510,155 B2 * | 3/2009 | Huang et al. | 248/278.1 |
| 7,637,463 B2 * | 12/2009 | Yen et al. | 248/157 |
| 2003/0235320 A1 * | 12/2003 | Hirschhorn | 381/333 |
| 2005/0036282 A1 * | 2/2005 | Hardage | 361/683 |
| 2006/0157627 A1 * | 7/2006 | Hung | 248/276.1 |
| 2007/0003365 A1 * | 1/2007 | Walt et al. | 403/362 |
| 2008/0029670 A1 * | 2/2008 | Hung | 248/278.1 |

* cited by examiner

*Primary Examiner* — Terrell McKinnon
*Assistant Examiner* — Michael McDuffie
(74) *Attorney, Agent, or Firm* — Michael J. Weins; Jeffrey E. Semprebon

(57) ABSTRACT

An adjustable arm supports a device housing with respect to a base and allows the position of the device housing to be adjusted as desired. The adjustable arm has segments joined by pivot joints, with passages therethrough to allow wires to be strung through the arm segments and joints so as to be shielded by the arm. The joints can be either dual-pivot joints or single pivot joints, and for both types of joints, the frictional resistance of the joints can be adjusted. In some embodiments, the elements of the arm can be strung onto the wiring prior to assembly.

16 Claims, 11 Drawing Sheets

ADJUSTABLE SUPPORT ARM FOR AUDIO VISUAL DEVICE

FIELD OF THE INVENTION

The present invention relates to an adjustable arm suitable for supporting an audio visual device in a desired position with respect to a base.

BACKGROUND OF THE INVENTION

Small, individual audio visual devices are frequently used to provide both entertainment and information to users. While such devices can be handheld, it is often desirable for the device to be positionable with respect to a base to avoid a need for the user to hold the device in a suitable position for long periods of time.

One approach to supporting an audio visual device is taught in U.S. Pat. No. 6,104,443, which teaches a suspended television receiver or video monitor. The television receiver of the '443 patent is mounted to a positioning mechanism that allows the user to place the television receiver at a desired location and angle for comfortable viewing. The '443 patent discloses both a flexible gooseneck and a parallel arm structure where the parallel arms are connected to provide a scissor-type action as they are adjusted to position the television receiver. A gooseneck makes precisely positioning the television receiver difficult for a user, since the gooseneck can have a large elastic component when bent, which will relax once the user releases the television receiver. Alternatively, the gooseneck may be subject to drooping under the weight of the television receiver as the distance from the base increases. Additionally, a gooseneck is not well suited for readily moving the television receiver between viewing and storage positions. The alternative positioning mechanism taught in the '443 patent, which uses parallel arms, can pinch the user the position of the television receiver is adjusted.

SUMMARY OF THE INVENTION

The present invention relates to an adjustable arm suitable for supporting an audio visual device with respect to a base to allow the position of the device to be adjusted so as to direct the visual display and sound to the location of a viewer. The base typically rests on a horizontal surface.

The adjustable arm has an arm first end and an arm second end, and the adjustability of the arm is provided by forming the arm with arm segments that are connected together with pivoting joints. The use of a segmented arm allows the localization of the movement to the pivoting joints that connect the segments, and the concentration of the relative movement allows finer control of the motion. Resistance to creep is provided by frictional resistance between the elements of the pivoting joints, and in some embodiments the degree of friction between components of the joint can be adjusted. In some embodiments, some of the arm segments are formed with multiple arm segment elements, in which case all of the arm elements in a given arm segment move as unit.

The arm segments and pivoting joints provide one or more continuous internal paths of sufficient size to allow passing cables and/or wires through the arm to convey power and/or audio visual signals from the base to the device supported on the arm. The arm can be configured such that continuous wires can be passed through the arm elements.

In some embodiments, the pivot joints between the arm segments have dual pivot axes which are rotatably mounted with respect to each other and rotate in planes with are parallel to each other. Each of the connected arm segments in turn is pivotally mounted with respect to one of the dual pivot axes.

BRIEF DESCRIPTION OF THE DRAWINGS

FIG. 8 also illustrates two alternative clips which can be employed in the coupling to adjust the degree of friction between the saddle brackets.

FIG. 19 shows the joint assembly in an inverted position to illustrate passages provided for passing wiring through the joint assembly.

DETAILED DESCRIPTION OF THE PREFERRED EMBODIMENTS

Figure 1:
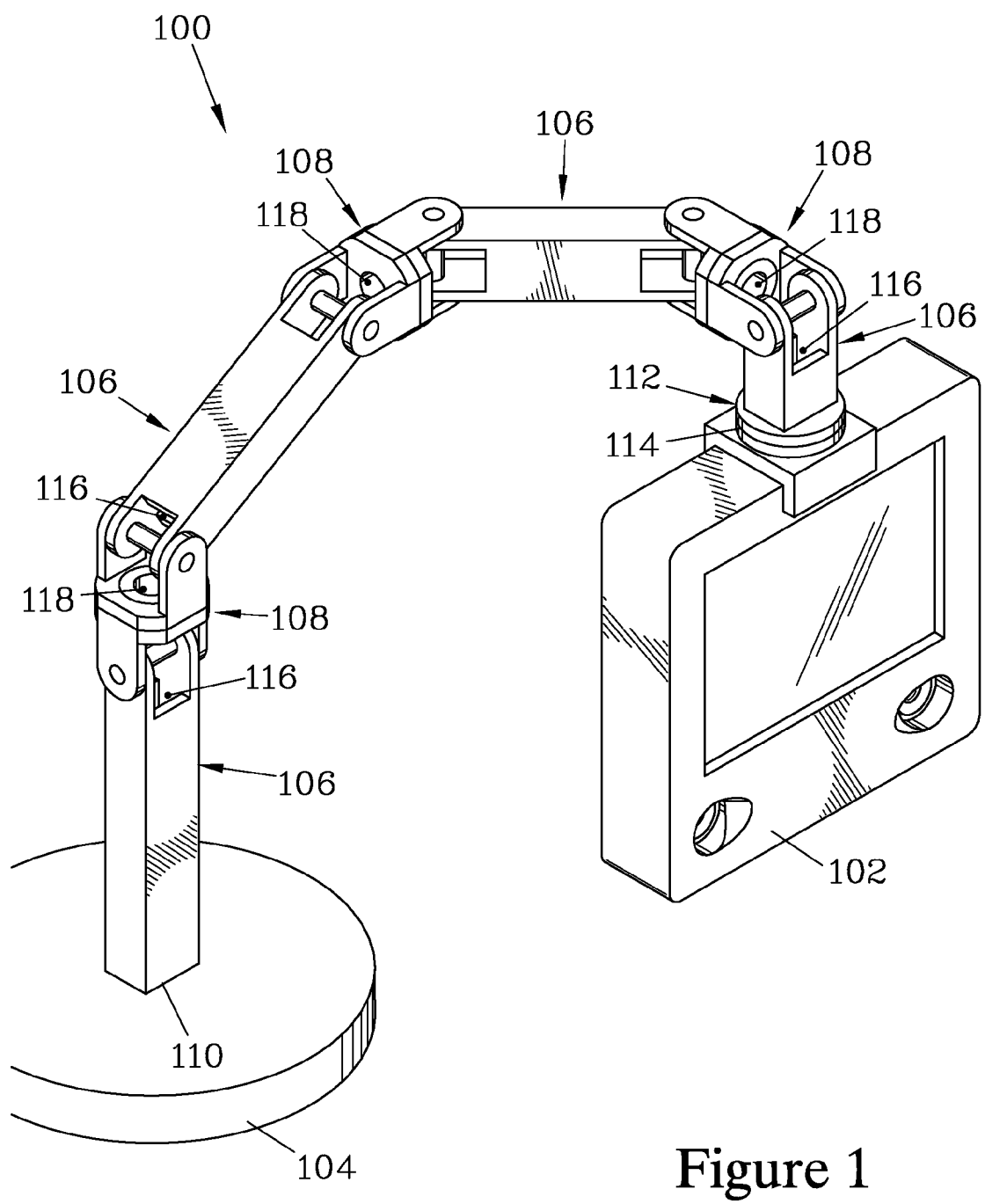
FIG. 1 is an isometric view illustrating an adjustable arm which forms one embodiment of the present invention, which serves to support a device housing at a desired position with respect to a base. In this embodiment, the arm is constructed from a series of hollow arm segments connected by adjustable joint assemblies having dual pivot axes which are rotatable with respect to each other to provide three degrees of freedom between adjacent arm segments. This adjustable arm configuration is well suited for applications where power and signals are to be provided from the base to the device housing by power and signal cables, since the arm provides a continuous passage along its length through which shielded cables can be passed with sufficient shielding to prevent interference of the power with the audio/video signals. The adjustable joint assemblies, with their dual axes which are adjustable with respect to each other, maintain the flexibility of the arm so that it can be passed around obstacles; however, due to the localization of the pivotal action, the arm can be easily readjusted and has a low susceptibility to drooping. This arm configuration is also readily foldable to facilitate storage.

FIG. 1 illustrates an adjustable arm 100 which forms one embodiment of the present invention. The adjustable arm 100 serves to support a device housing 102 in a desired position and orientation with respect to a base 104. The adjustable arm 100 is constructed from rigid arm segments 106 that are pivotally and rotatably engaged with respect to each other with bi-pivotable adjustable joint assemblies 108 to provide for adjustability. Examples of structures that can provide these joint assemblies 108 are discussed below with reference to FIGS. 2-10. The use of the rigid arm segments 106 in the adjustable arm 100 allows fine adjustment of the adjustable arm 100 to position the device housing 102, since the freedom of motion is localized at the bi-pivotable adjustable joint assemblies 108, which makes the adjustable arm 100 less subject to spring-back than continuously-adjustable structures for positioning, such as the traditional use of a flexible "gooseneck". The freedom of adjustability offered by using the bi-pivotable adjustable joint assemblies 108 in the arm 100 permits the arm 100 to traverse a non-planar path, allowing the arm 100 to be configured so as to pass around obstacles.

The adjustable arm 100 terminates in an arm first end 110 and an arm second end 112. The arm first end 110 is affixed to the base 104, while the arm second end 112 is attached to the device housing 102 and incorporates a pivot coupling 114. The rigid arm segments 106 each have arm segment passages 116 therethrough, and the adjustable joint assemblies 108 each have a joint passage 118 therethrough to allow cables and power cords (not shown) to be passed through the adjustable arm 100 from the base 104 to the device housing 102. While the arm segments 106 are illustrated as being formed of rectangular tubular stock, other tubular shapes could be employed while allowing cables to be passed therethrough. In the arm 100, wires and/or cables can be threaded through the elements of the arm 100 either before or after the rigid arm segments 106 and the adjustable joint assemblies 108 have been assembled to form the arm 100.

Having the arm segments 106 formed as single elements has advantages over the use of paired elements that are pivotably joined so as to change their spacial separation as the arm is adjusted, such as is taught in U.S. Pat. No. 6,104,443. The adjustable arm 100 may be adjusted by the user without concern of being pinched when manipulating the arm segments, since the adjustable arm 100 does not have paired elements in the arm segments 106 which could be brought into contact during use as the user manipulates elements of the arm 100.

Figure 2:
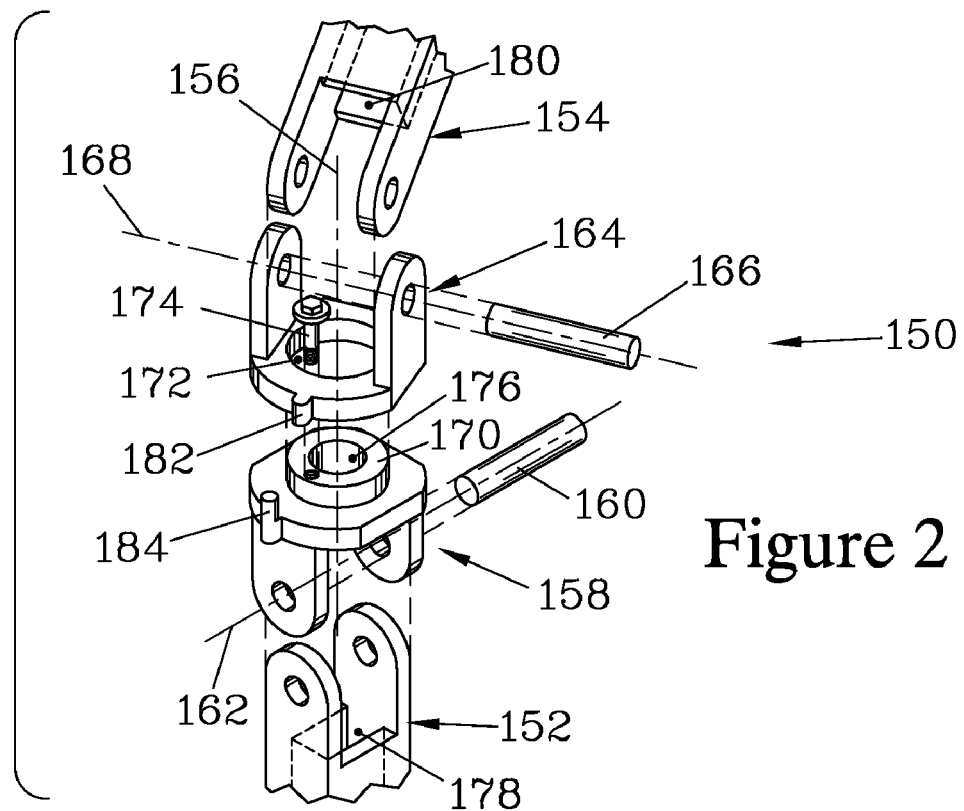
FIG. 2 is an exploded view showing details of one adjustable dual pivot axis joint assembly that could be employed to connect two adjacent arm segments of the embodiment shown in FIG. 1. The adjustable joint assembly has a joint passage therethrough that allows for the passage of a cable through the length of the arm and permits the cable to provide both power and signals to the device housing via cords and cables, without requiring the cords and cables to pass outside the joint. In this embodiment, maintaining the cables internal relies on the stiffness of the cables, and the frictional forces of the joint are not readily adjustable.

FIG. 2 illustrates one example of a bi-pivotable adjustable joint assembly 150 which could be employed to provide the joint assemblies 108 in the embodiment illustrated in FIG. 1. FIG. 2 shows the adjustable joint assembly 150 exploded. The adjustable joint assembly 150 provides pivotal motion between an arm first segment 152 and an arm second segment 154, allowing pivotable adjustment between the arm segments (152, 154), as well as allowing rotation of the pivotal movement of each of the arm segments (152, 154) with respect to the other about a bracket rotation axis 156.

The adjustable joint assembly 150 employs a first saddle bracket 158, which pivotably, slidably engages the arm first segment 152 and, once engaged, is held there by friction forces either by direct contact of the engaging surfaces or through contact with an intermediate element maintained therebetween (this latter scheme being discussed below in the description of FIGS. 3 and 4). A first pivot pin 160 passing through the first saddle bracket 158 and through the arm first segment 152 provides a first pivot axis 162. Similarly, a second saddle bracket 164 pivotably, slidably engages the arm second segment 154 and, once engaged, is held by friction forces either by direct contact of the engaging surfaces or through contact with an intermediate element maintained therebetween. A second pivot pin 166 passing through the second saddle bracket 164 and the arm second segment 154 provides a second pivot axis 168.

The saddle brackets (158, 164) are rotatably engaged with each other about the bracket rotation axis 156, and means are provided to maintain the saddle brackets (158, 164) in frictional engagement. In the adjustable joint assembly 150 illustrated, the first saddle bracket 158 has a saddle post 170 which rotatably, slidably engages a saddle passage 172 in the second saddle bracket 164. A tie down bolt 174 threadably engages the saddle post 170 and extends over the second saddle bracket 164, serving to secure the two saddle brackets (158, 164) with respect to each other. As the saddle brackets (158, 164) are rotated with respect to each other about the bracket rotation axis 156, the first pivot axis 162 is rotated with respect to the second pivot axis 168.

The saddle post 170 has a joint passage 176 therethrough, which is of sufficient size to accommodate cables and power cords (not shown) without binding.

Preferably, blocking means are provided to limit the rotation between the saddle brackets (158, 164) to somewhat less than 360° to avoid undue twisting of the cables and/or the power cord passing therethrough. One simple blocking means can be provided by a first block 182 extending radially outward from the second saddle bracket 164 and a second block 184 which is affixed to the first saddle bracket 158 and which is positioned to engage the first block 182 as the saddle brackets (158, 164) are rotated with respect to each other, this engagement serving to limit rotation between the first saddle bracket 158 and the second saddle bracket 164.

The arm segments (152, 154) can be pivoted with respect to each other by applying a force sufficient to overcome the friction between one of the arm segments (152, 154) and its associated saddle bracket (158, 164). Once readjusted, the arm segments (152, 154) are maintained in the new position by friction between the saddle brackets (158, 164) and their associated arm segments (152, 154). Similarly, rotation between the arm segments (152, 154) is provided by rotation between the saddle brackets (158, 164). This rotation is provided by applying a twisting torque between the saddle brackets (158, 164) to overcome friction between the two saddle brackets (158, 164).

Figure 3:
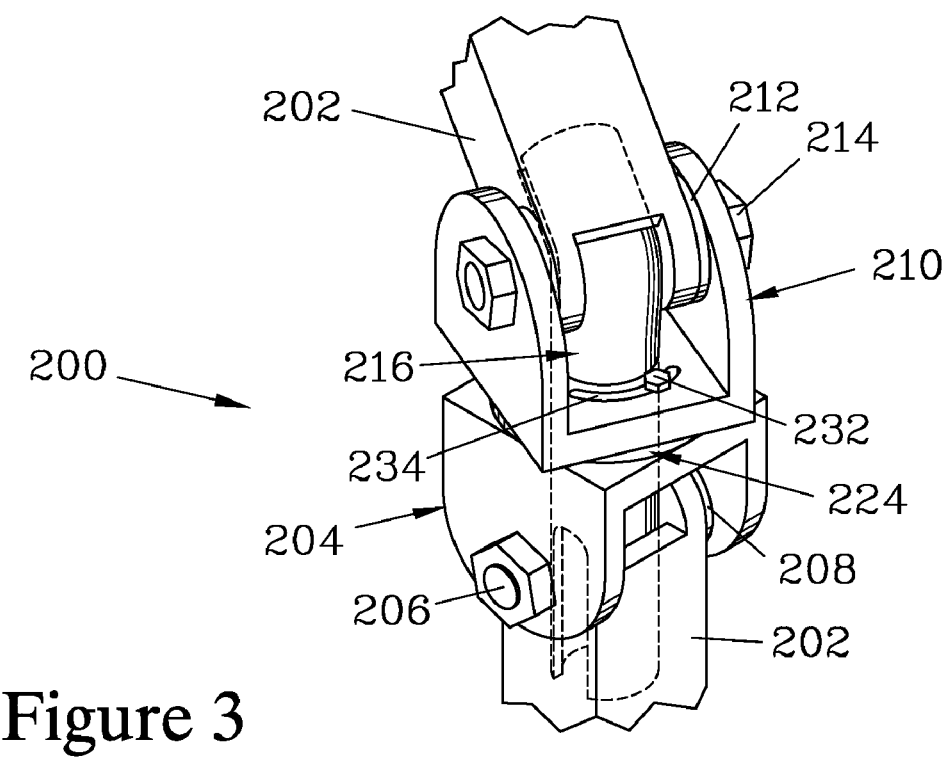
FIG. 3 is an assembled view of another dual pivot axis adjustable joint which provides a range of motion similar to that of the adjustable joint shown in FIG. 2. The adjustable joint shown in FIG. 3 is designed so that the frictional forces resisting movement of arm segments with respect to each other and the frictional forces between two saddle brackets are adjustable. This embodiment also has a flexible tube that serves as a cable sheath for maintaining the cable within the confines of the joint when the joint is flexed.
Figure 4:
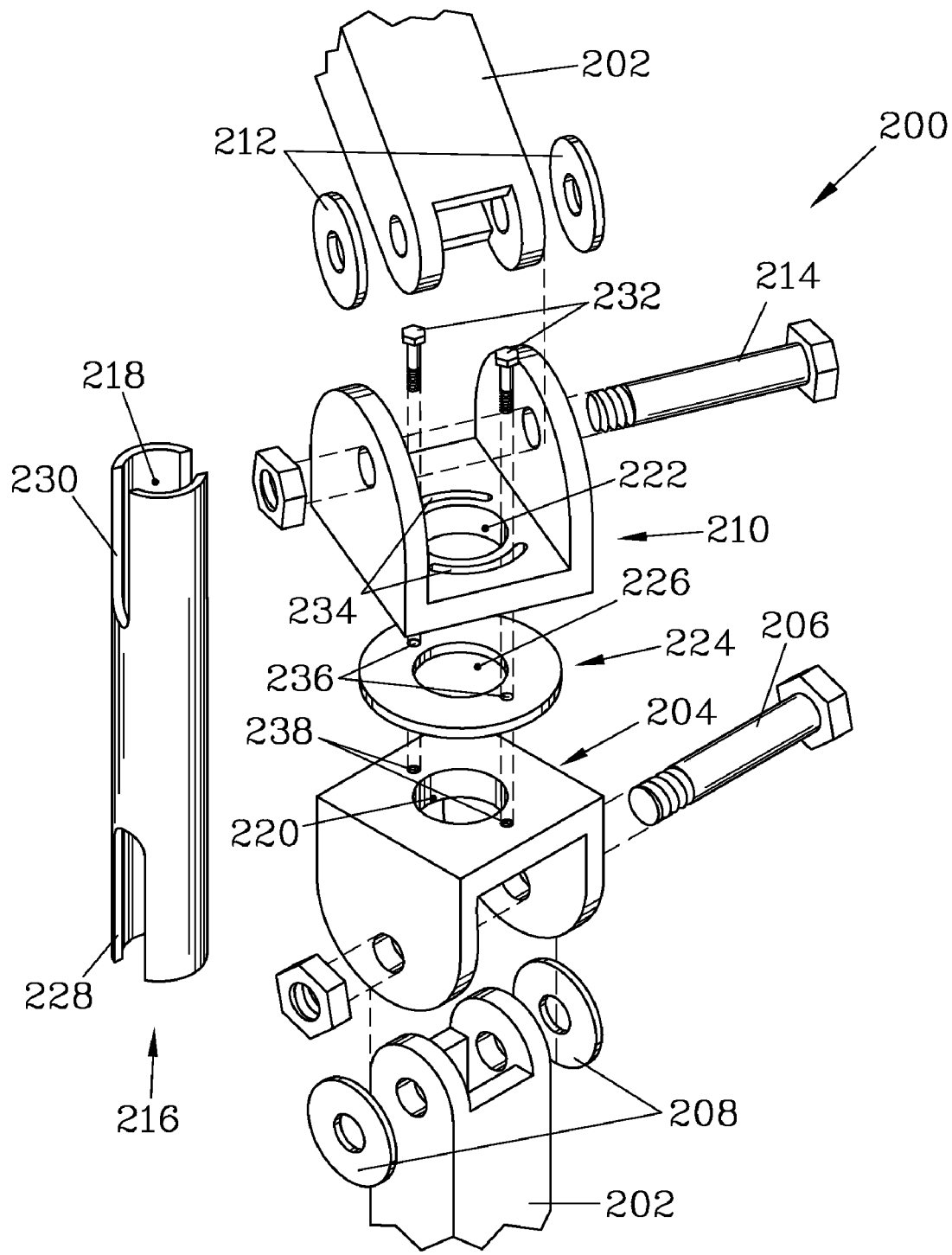
FIG. 4 is an exploded view of the joint illustrated in FIG. 3.

FIGS. 3 and 4 illustrate an alternative bi-pivotable adjustable joint assembly 200 which could be employed in an embodiment such as that illustrated in FIG. 1. The adjustable joint assembly 200 is shown assembled in FIG. 3 and exploded in FIG. 4. The adjustable joint assembly 200 again provides pivotal and rotational motion between two rigid arm segments 202, but also provides protection against exposure for cables and/or wires (not shown) passing through the adjustable joint assembly 200.

The adjustable joint assembly 200 has a first saddle bracket 204, which pivotably engages one of the rigid arm segments 202 and is mounted thereto by a first pivot bolt 206. A first pair of friction washers 208 are interposed between the rigid arm segment 202 and the first saddle bracket 204, and the first pivot bolt 206 can be tightened to compress the first pair of friction washers 208 to vary the frictional resistance to pivoting between the rigid arm segment 202 and the first saddle bracket 204. Similarly, a second saddle bracket 210 pivotably engages another of the rigid arm segments 202, and friction to resist pivoting is provided by a second pair of friction washers 212 and a second pivot bolt 214.

A flexible tube 216 is provided, which is better shown in the exploded view of FIG. 4. The flexible tube 216 has a joint passage 218 therethrough, which provides a conduit for cables and/or wiring. In FIG. 4, the flexible tube 216 is shown off to the side to more clearly show the structure of the various components of the adjustable joint assembly 200. The flexible tube 216 is sized to slidably engage a first bracket passage 220 in the first saddle bracket 204 and a second bracket passage 222 in the second saddle bracket 210. Interposed between the first saddle bracket 204 and the second saddle bracket 210 is a friction ring 224 having a friction ring passage 226 through which the flexible tube 216 also passes. The flexible tube 216 has a first bolt notch 228, configured to accommodate the first pivot bolt 206, and a second bolt notch 230, configured to accommodate the second pivot bolt 214. As the first saddle bracket 204 rotates relative to the second saddle bracket 210, the first bolt notch 228 and the second bolt notch 230 rotate with the saddle brackets (204, 210), twisting the flexible tube 216. While the flexible tube 216 is sufficiently elastic to accommodate some twisting due to rotation, this twisting may limit the rotation between the first saddle bracket 204 and the second saddle bracket 210.

The saddle brackets (204, 210) are attached together by a pair of bracket bolts 232. The bracket bolts 232 pass through bolt slots 234 in the second saddle bracket 210 and through bolt passages 236 in the friction ring 224, and threadably engage bolt receivers 238 in the first saddle bracket 204. Advancing the bracket bolts 232 in the bolt receivers 238 draws the first saddle bracket 204 and the second saddle bracket 210 together, compressing the friction ring 224 and increasing the frictional resistance to rotation between the first saddle bracket 204 and the second saddle bracket 210. The bolt slots 234 in the second saddle bracket 210, in combination with the bracket bolts 232, provide the means for rotatably engaging the first saddle bracket 204 with the second saddle bracket 210, and also provide blocking means to limit the rotation between the saddle brackets (204, 210). This limits twisting of the flexible tube 216 and any cables and/or wiring passing therethrough.

Figure 5:
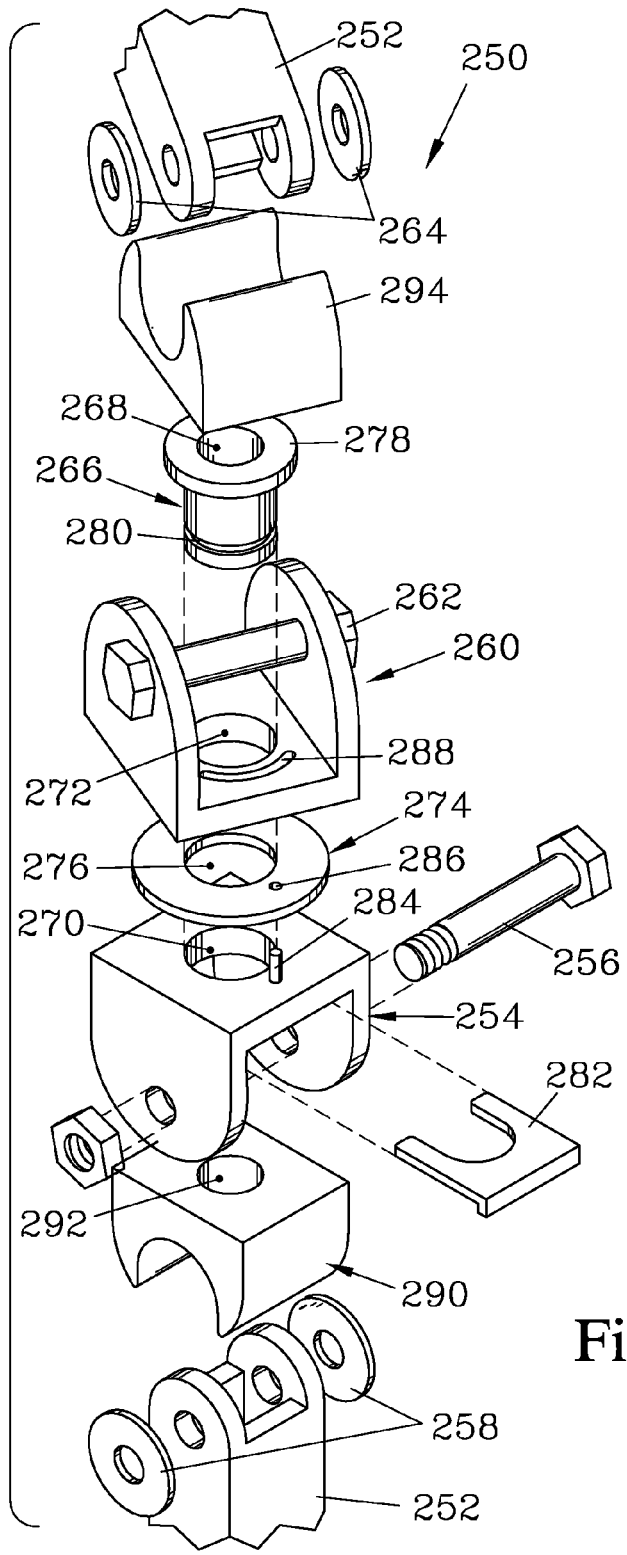
FIG. 5 is an exploded isometric view of another embodiment of a dual pivot axis adjustable joint of the present invention, which shares many features of the adjustable joint illustrated in FIGS. 3 and 4. This embodiment differs, in part, in the use of cowlings to assure that the cables are maintained within the joint. It also employs a quick release coupling for separation of two saddle brackets into which the arm segments are pivotally mounted.
Figure 6:
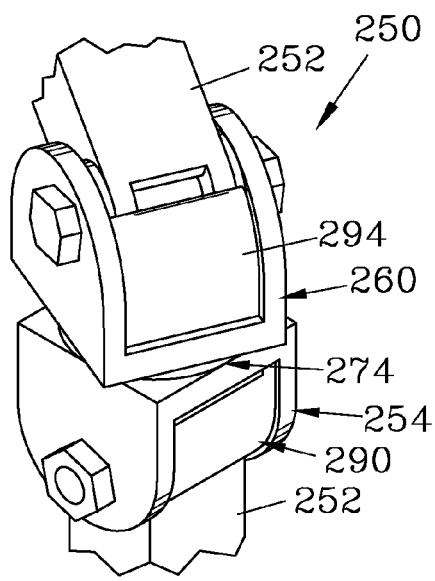
FIG. 6 is a view of the adjustable joint of FIG. 5 when assembled.

FIGS. 5-10 illustrate another bi-pivotable adjustable joint assembly 250 which provides pivotal and rotational motion between two rigid arm segments 252, as well as providing protection against exposure for cables and/or wires passing through the adjustable joint assembly 250. FIG. 5 is an exploded view of the adjustable joint assembly 250, while FIG. 6 is an assembled view of the adjustable joint assembly 250.

The adjustable joint assembly 250 again has a first saddle bracket 254, which is pivotably attached to one of the rigid arm segments 252 by a first pivot bolt 256. A first pair of friction washers 258 are compressed between the rigid arm segment 252 and the first saddle bracket 254 as the first pivot bolt 256 is tightened to adjust the frictional resistance to pivoting between the rigid arm segment 252 and the first saddle bracket 254. A second saddle bracket 260 is pivotably attached to another of the rigid arm segments 252 by a second pivot bolt 262, and friction to resist pivoting is provided by a second pair of friction washers 264.

Figure 7:
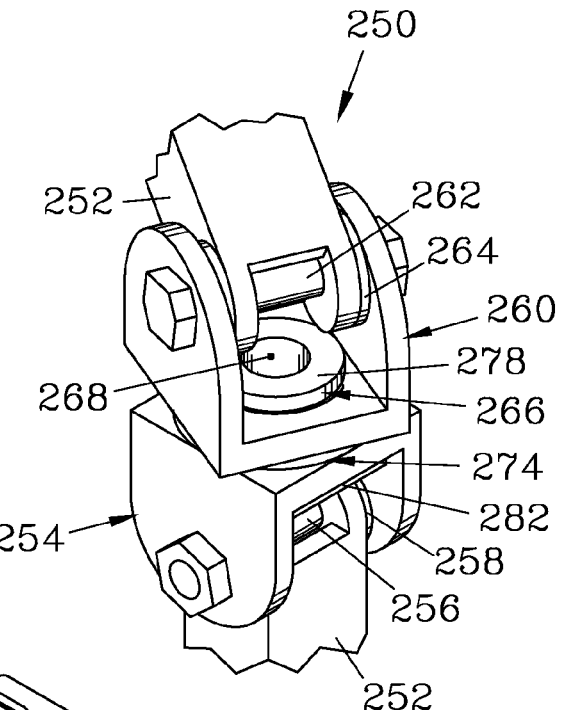
FIG. 7 illustrates the adjustable joint shown in FIGS. 5 and 6 assembled; however, in this view the cowlings are not shown.
Figure 8:
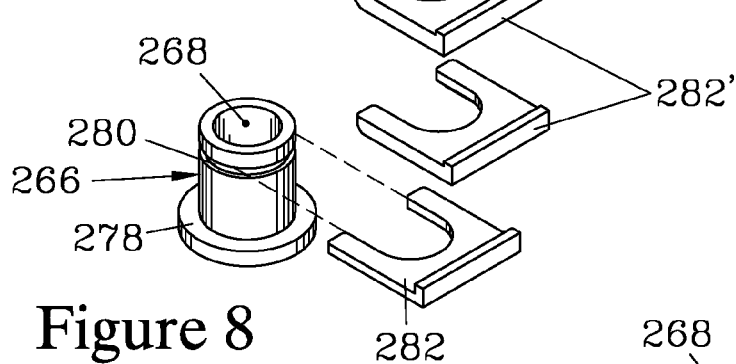
FIG. 8 illustrates the quick release coupling employed in the adjustable joint shown in FIGS. 5-7 when unassembled.
Figure 9:
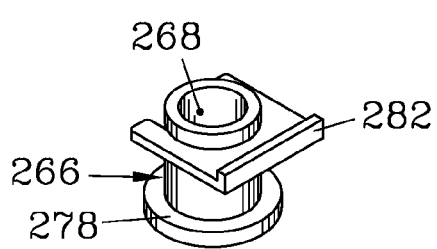
FIG. 9 illustrates the quick release coupling shown in FIG. 8 when assembled.

In this embodiment, a rigid tube 266 provides a conduit for cables and/or wiring (not shown), and serves to rotatably engage the first saddle bracket 254 and the second saddle bracket 260. In this embodiment, the rigid tube 266 also serves to attach the first saddle bracket 254 and the second saddle bracket 260 together. The rigid tube 266 has a joint passage 268 therethrough, and rotatably engages a first bracket passage 270 in the first saddle bracket 254 and a second bracket passage 272 in the second saddle bracket 260, shown in FIG. 5. Interposed between the first saddle bracket 254 and the second saddle bracket 260 is a friction ring 274 having a friction ring passage 276 through which the rigid tube 266 passes. The rigid tube 266 has a tube flange 278 and a clip notch 280, as best shown in FIG. 8. When the saddle brackets (254, 260) are pressed together with the friction ring 274 compressed therebetween, the rigid tube 266 is passed through the second bracket passage 272, the friction ring passage 276, and the first bracket passage 270 and is secured by a retainer clip 282 that slidably engages the clip notch 280 on the rigid tube 266, as shown in FIG. 9. FIG. 7 shows the retainer clip 282, when engaged in the clip notch 280, and the tube flange 278 serving to maintain the first saddle bracket 254 and the second saddle bracket 260 connected together with a degree of compression on the friction ring 274 positioned between the first saddle bracket 254 and the second saddle bracket 260.

Figure 10:
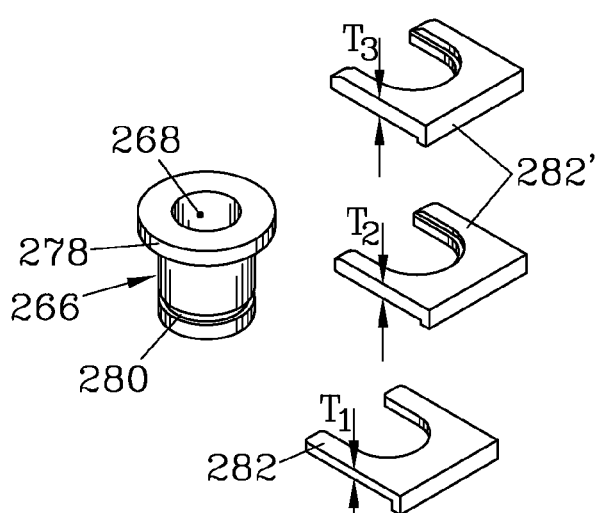
FIG. 10 illustrates the elements shown in FIG. 8 in an inverted position to more clearly show the structure of the alternative clips.

The degree of friction between the saddle brackets (254, 260) could be adjusted by varying the thickness and/or the compressibility of the friction ring 274. However, to allow the degree of friction to be adjusted after the elements of the adjustable joint assembly have been strung onto wires and/or cables, it is preferred to provide alternative retainer clips 282' (shown in FIGS. 8 and 10) that can be substituted for the retainer clip 282 to adjust the degree of compression of the friction ring 274. While the retainer clips 282' are configured to engage the clip notch 280 of the rigid tube 266, they each have a greater effective thickness ($T_2$, $T_3$) than the thickness $T_1$ of the retainer clip 282, as shown in FIG. 10. Due to this greater effective thickness ($T_2$, $T_3$), the retainer clips 282' draw the saddle brackets (254, 260) closer together when engaged with the clip notch 280, providing increased compression of the friction ring 274 and correspondingly greater friction between the saddle brackets (254, 260). A similar effect could be achieved by interposing a shim at some point between the retainer clip 282 and the tube flange 278 of the rigid tube 266.

Referring again to FIG. 5, a post 284 on the first saddle bracket 254 passes through a post passage 286 in the friction ring 274 and engages a slot 288 in the second saddle bracket 260. The post 284 and the slot 288 provide blocking means to limit the rotation between the saddle brackets (254, 260).

To protect any cables and/or wires from exposure, the first saddle bracket 254 is provided with a first cowling 290 having a first cowling passage 292 therethrough. The first cowling 290 is formed of a resilient compressible material, and is configured to substantially fill open spaces in the first saddle bracket 254 as it pivots relative to the rigid arm segment 252, as shown in FIG. 6. Similarly, the second saddle bracket 260 is provided with a second cowling 294 of resilient compressible material, having a second cowling passage (not shown) therethrough and configured to substantially fill open spaces in the second saddle bracket 260. The coverage provided by the first cowling 290 and the second cowling 294 can be appreciated by comparison of FIG. 6, where the cowlings (290, 294) are shown in place, with FIG. 7, discussed earlier, where the cowlings (290, 294) are omitted to more clearly show the interaction of the tube flange 278 of the rigid tube 266 with the second saddle bracket 260.

Figure 11:
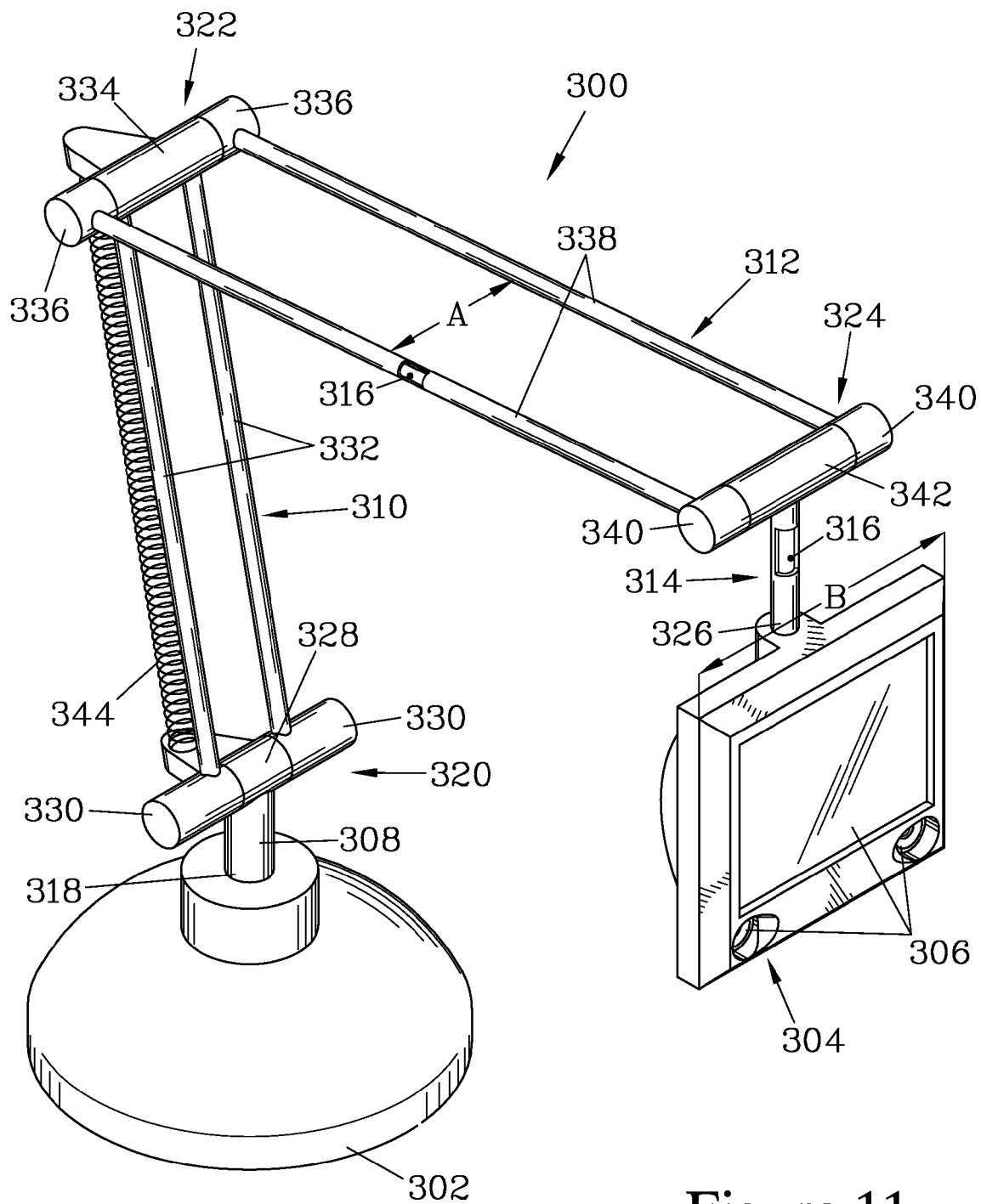
FIG. 11 is an isometric view that illustrates another embodiment of the adjustable arm of the present invention. In this embodiment, the adjustable arm has rigid segments connected by single-axis pivot joints. The arm terminates in an arm first end, which is rotatably mounted to a base, and an arm second end, that is rotatably connected to a device housing. The arm has two intermediate sections having pivot joints that are connected by a spring which counters the effects of torque created by the weight of the device housing.

FIG. 11 is an isometric view of an adjustable arm 300 which offers less freedom in adjustability compared to the arm 100 shown in FIG. 1, but which provides a continuous concealment of wires and/or cables as they pass therethrough so as to connect between a base 302 and a device housing 304 containing an audio visual display system 306. The passages through the elements of the adjustable arm 300 are interconnected to allow wires and cables to be strung so as to provide shielding therebetween. The adjustable arm 300 is fabricated from rigid arm segments that include an arm first segment 308, an arm second segment 310, an arm third segment 312, and an arm fourth segment 314. All of the arm segments (308, 310, 312, and 314) are provided with passages 316 therethrough which, as noted above, allow for the concealment of video and audio signal cables (not shown) and a power cord (also not shown) which provide power and signals to the audio visual display system 306. As discussed in greater detail below with regard to FIG. 12, this design also facilitates assembly, and, more importantly, allows wires and/or cables to be passed through from the base 302 to the device housing 304 without any splices or terminations, helping to preserve signal quality.

The arm first segment 308 terminates in an arm first end 318 and is rotatably mounted to the base 302. The arm first segment 308 is pivotably attached to the arm second segment 310 via a first hollow pivot joint 320 which has a cavity (not shown) therein for passage of wires and cables therethrough. Examples of hollow pivot joints which could be employed are shown in FIGS. 14-17 and are discussed in greater detail below. The arm second segment 310 is also attached to a second hollow pivot joint 322 which has a cavity therein for passage of wires and cables therethrough. The second hollow pivot joint 322 also attaches to the arm third segment 312 and provides pivotal motion between the arm second segment 310 and the arm third segment 312. The arm third segment 312 in turn attaches to the arm fourth segment 314 via a third hollow pivot joint 324 to provide pivotal motion between the arm third segment 312 and the arm fourth segment 314. Again, a cavity is provided in the third hollow pivot joint 324 for passage of wires and cables therethrough. The arm fourth segment 314 terminates in an arm second end 326 that is rotatably mounted to the device housing 304.

In this embodiment, the first hollow pivot joint 320 has a first joint central region 328 that is frictionally engaged with two first joint end caps 330. The arm first segment 308 is attached to the first joint central region 328, while the first joint end caps 330 are attached to the arm second segment 310. The arm second segment 310 of the embodiment illustrated is formed by a pair of second segment members 332, one of which is attached to each of the first joint end caps 330. Similarly, the second hollow pivot joint 322 has a second joint central region 334 and a pair of second joint end caps 336. The second segment members 332 of the arm second segment 310 are attached to the second joint central region 334, while the arm third segment 312 is attached to the second joint end caps 336. The arm third segment 312 is formed by a pair of spaced-apart third segment members 338, one of which is attached to each of the second joint end caps 336. The third hollow pivot joint 324 has third joint end caps 340, to which the third segment members 338 are attached, and a third joint central region 342, to which the arm fourth segment 314 is attached.

The design of the arm 300 has particular utility since the paired arm elements of the arm second segment 310 and the third segment 312 restrict the rotational freedom of these arm segments with respect to each other to avoid excessive twisting of wires and/or cables passing therethrough. Furthermore, if the third segment members 338 are spaced apart by an arm member separation A that is maintained substantially less than a breadth B of the device housing 304, then the pair of third segment members 338 reduce the likelihood of inadvertent twisting that might otherwise result from movement of the third hollow pivot joint 324.

The adjustable arm 300 allows the device housing 304 to be supported at a desired position. While frictional engagement between the joint central regions (328, 334, 342) and the end caps (330, 336, 340) of the hollow pivot joints (320, 322, 324) can be sufficient to maintain the adjustable arm 300 in the desired position, it may be advantageous to connect a tension spring 344 between the first joint central region 328 of the first hollow pivot joint 320 and the second joint central region 334 of the second hollow pivot joint 322 to counteract forces due to the weight of the device housing 304 and the arm 300 on the arm second segment 310.

Figure 12:
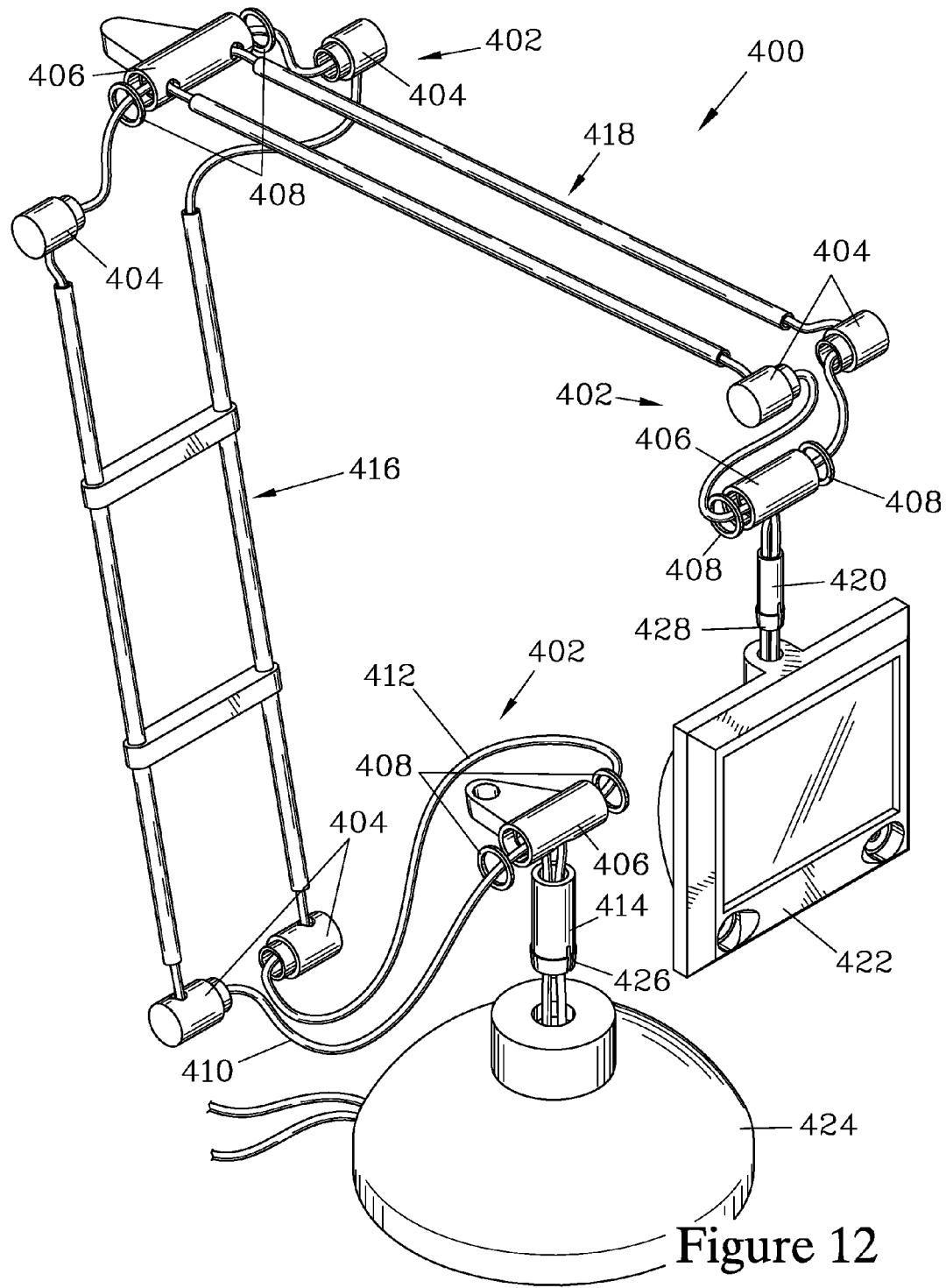
FIG. 12 is an exploded isometric view illustrating an adjustable arm similar to that shown in FIG. 11, showing how the components of the arm can be strung onto wiring before the elements of the arm have been assembled.
Figure 13:
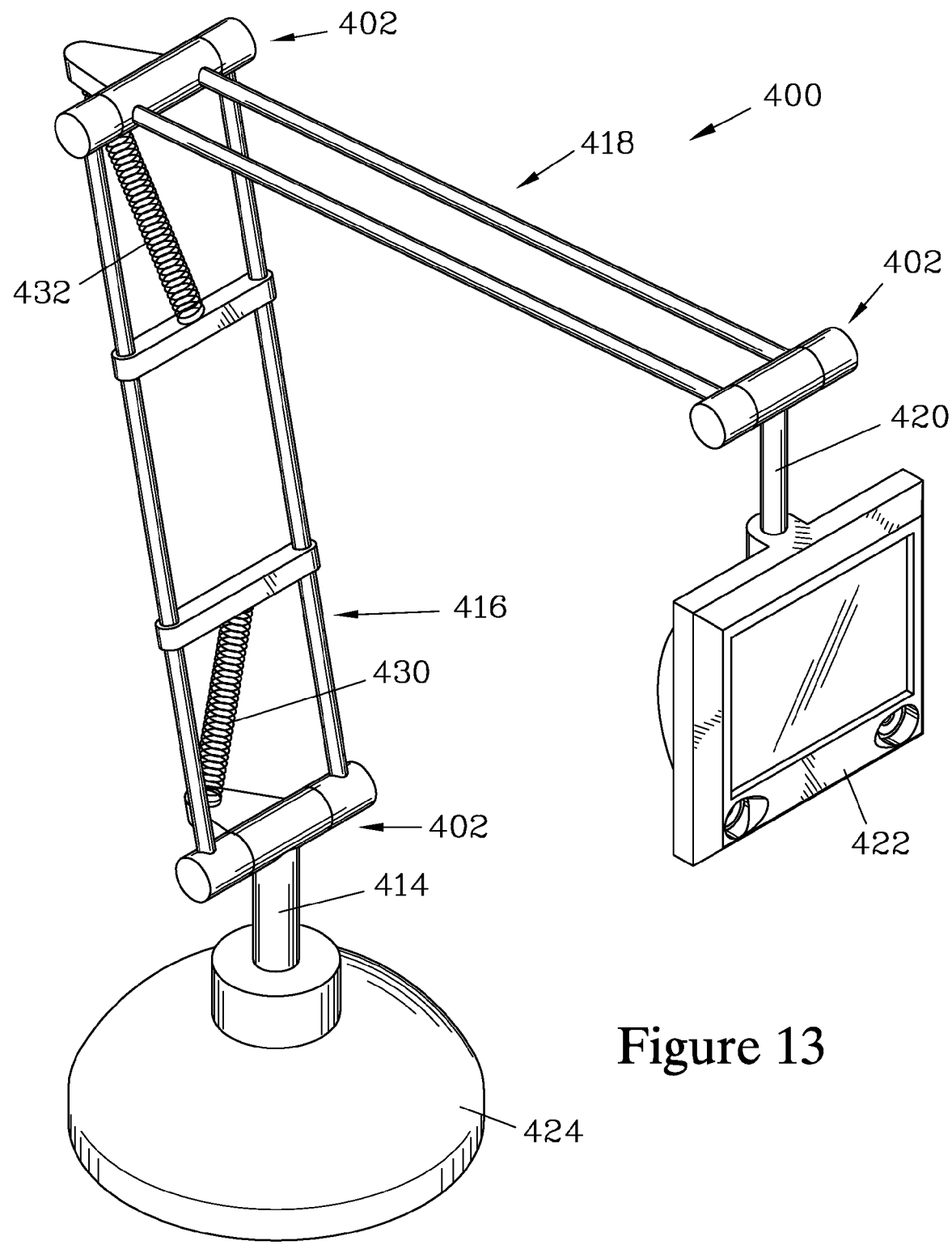
FIG. 13 is an assembled view of the embodiment shown in FIG. 12. In this embodiment, the adjustable arm employs two springs to counter the weight of a device housing, one spring serving to bias the arm segment to which it is connected against motion toward the device housing, and the other spring serving to bias an adjacent arm against the downward force of the device housing.

FIGS. 12 and 13 illustrate an adjustable arm 400, which is substantially similar to the adjustable arm 300 discussed above. FIG. 12 illustrates the individual elements of the arm 400 (with the exception of two tension springs) before assembly, while FIG. 13 illustrates the assembled arm 400 with the tension springs. The arm 400 employs three pivot joints 402, each of which has a pair of end caps 404 that rotatably engage a central joint element 406 when the pivot joint 402 is assembled, with friction washers 408 positioned therebetween.

To facilitate assembly, the elements of the adjustable arm 400 can be strung onto a power cord 410 and a signal cable 412 prior to assembly. If the pivot joints 402 are of the type discussed below with respect to FIG. 15, the degree of friction can be adjusted after the arm 400 is assembled.

As can be seen in FIG. 12, the power cord 410 and the signal cable 412 can be strung through an arm first segment 414, an arm second segment 416, an arm third segment 418 and an arm fourth segment 420, as well as through the end caps 404, the friction washers 408, and the central joint elements 406. Once the power cord 410 and the signal cable 412 have been strung through the respective elements of the adjustable arm 400, the arm segments (414, 416, 418, 420) can be affixed to the respective elements of the pivot joints 402 and the pivot joints 402 then assembled.

In this embodiment, all arm segments (414, 416, 418, 420) are constructed from tube stock with the arm first segment 414 and the arm fourth segment 420 being constructed with single tubes having larger diameters so as to allow them to readily accommodate both the power cord 410 and the signal cable 412 without creating interference between them. When formed from single tubes, the arm first segment 414 and the arm fourth segment 420 should be kept relatively short to reduce crosstalk between the power cord 410 and the signal cable 412.

Preferably, the lengths of the arm segments (414, 416, 418, 420) are selected such that the arm 400 can be folded for storage with a device housing 422 positioned directly above a base 424. One way that this can be readily achieved is by making the arm first segment 414 somewhat longer than the arm fourth segment 420. It is also preferred for the arm first segment 414 to have a greater cross section than the arm fourth segment 420 for improved appearance and to provide stability for the adjustable arm 400. The adjustable arm 400 terminates in an arm first end 426 and an arm second end 428, both of which are preferably configured with rotational snap interfaces that are designed to snap respectively into the base 424 and the device housing 422.

FIG. 13 illustrates a first spring 430 and a second spring 432 which are not shown in FIG. 12. The first spring 430 serves to bias the arm second segment 416 against the moment created by the arm third segment 418, the arm fourth segment 420, and the device housing 422. The second spring 432 serves to bias the movement of the arm third segment 418 against the weight of the device housing 422. Both the first spring 430 and the second spring 432 of this embodiment are connected to the arm second segment 416. It should be appreciated by one skilled in the art that other configurations would be possible.

Figure 14:
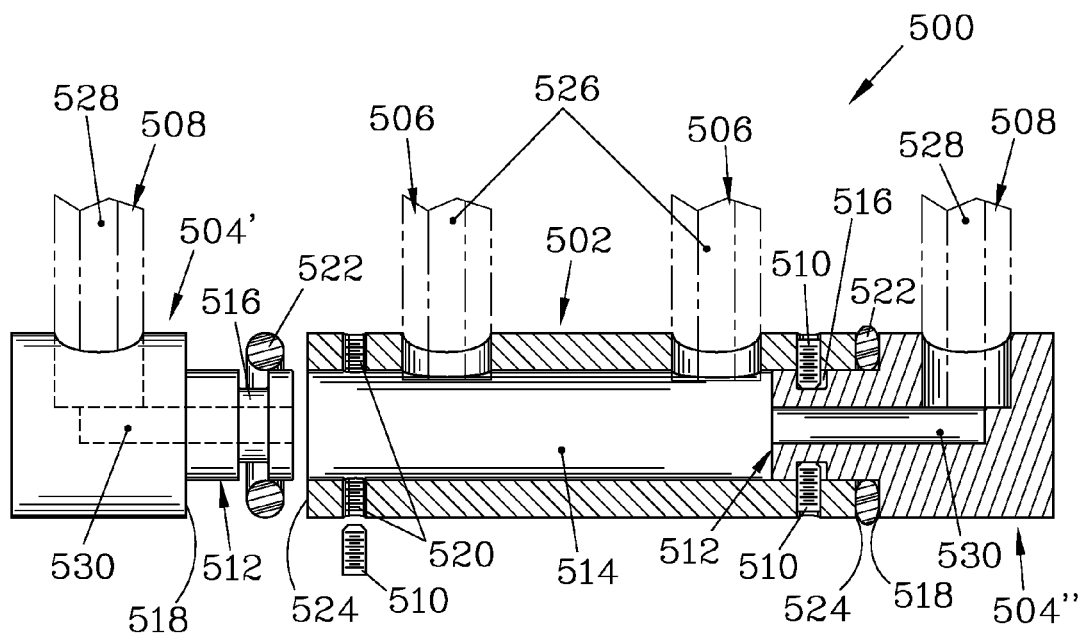
FIGS. 14 through 17 are section views that illustrate various single-axis pivot joints which are suitable for use connecting together arm segments in the embodiments illustrated in FIGS. 11-13, and which allow adjustment of the frictional force required to pivot adjacent arm segments relative to each other.

FIG. 14 illustrates one embodiment of a pivot joint 500 which could be employed in adjustable arms such as those shown in FIGS. 11-13, and illustrates the connection of passages in the arm segments to allow cables and/or wires (not shown) to pass therethrough. The pivot joint 500 has a joint central region 502 positioned between a pair of joint end caps (504' and 504"). The joint central region 502 is affixed to a first pair of arm members 506 (shown in phantom), while the joint end caps (504' and 504") are affixed to a second pair of arm members 508 (also shown in phantom).

The joint end cap 504' is shown prior to engagement with the joint central region 502, while the joint end cap 504" is shown after it has been engaged with the joint central region 502 and secured thereto by a number of set screws 510. Each of the joint end caps (504' and 504") has an insert portion 512 which is sized to slidably and rotatably engage a central passage 514 of the joint central region 502. The insert portion 512 has a securing groove 516 and terminates at an annular end cap bearing surface 518 on the joint end cap 504. The joint central region 502 has a number of screw passages 520, each of which threadably receives one of the set screws 510. When the insert portion 512 of the joint end cap 504 is forcibly inserted into the central passage 514 to align the securing groove 516 with the screw passages 520, deforming an O-ring 522, the set screws 510 can be advanced to engage the securing groove 516 to maintain the joint end cap 504 engaged with the joint central region 502 with the O-ring 522 compressed therebetween.

The joint central region 502 has a pair of central region bearing surfaces 524, each opposed to one of the end cap bearing surfaces 518 when the insert portion 512 of the joint end cap 504 is inserted into the central passage 514. The O-rings 522 are interposed between each of the central region bearing surfaces 524 and the opposing end cap bearing surface 518. The O-ring 522 is a compressible element which is resiliently compressed between the central region bearing surface 524 and the end cap bearing surface 518 when the insert portion 512 is advanced into the central passage 514 to align the securing groove 516 with the screw passages 520. The compression of the O-ring 522 causes it to forcibly engage both the central region bearing surface 524 and the end cap bearing surface 518 to provide friction between the joint end caps 504 and the joint central region 502 to resist rotation therebetween. The degree of friction between the joint end caps 504 and the joint central region 502 can be adjusted by varying the thickness and/or compressibility of the O-rings 522 with respect to the separation between the end cap bearing surfaces 518 and the central region bearing surfaces 524. However, this does not allow for adjusting the degree of friction in the joint after the elements have been strung onto wires and/or cables.

The first pair of arm members 506 of this embodiment are both formed as tubular members, each having a first arm member passage 526 that communicates with the central passage 514 of the joint central region 502. Similarly, the second pair of arm members 508 are also formed as tubular members, each having a second arm member passage 528. Each of the joint end caps 504 has an end cap passage 530 that communicates between one of the second arm member passages 528 and the central passage 514. Thus, cables (not shown) can be passed through the second arm member passages 528, the end cap passages 530, the central passage 514, and the first arm member passages 526 to allow power and/or media signals to be transmitted through the pivot joint 500. While the pivot joint 500 illustrated provides two separate paths for cables to be run, it should be appreciated that in some applications only a single path may be required. The pivot joint 500 is well suited to stringing the wires through the components of the arm before assembly; however, as noted, the degree of friction in the pivot joint 500 cannot be subsequently adjusted.

Figure 15:
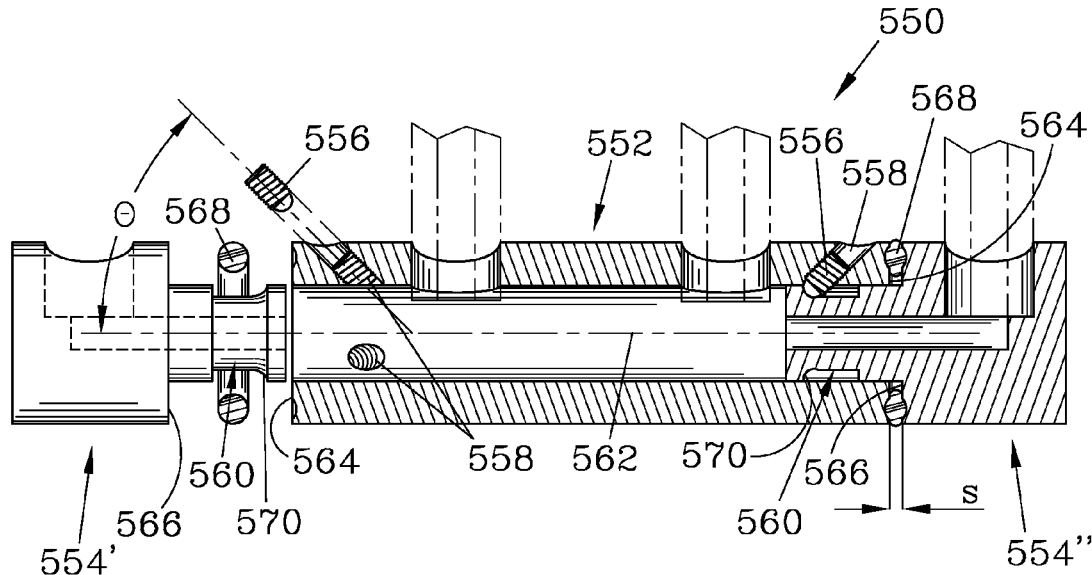

FIG. 15 illustrates a pivot joint 550 which shares many features in common with the pivot joint 500 discussed above. However, the pivot joint 550 allows the frictional resistance to pivoting to be readily adjusted by the user, without requiring any substitution of parts, and allows the degree of friction to be adjusted after assembly. The pivot joint 550 again has a joint central region 552 and a pair of joint end caps (554' and 554") which are slidably and rotatably engaged with the joint central region 552. The joint end caps (554' and 554") are maintained in the joint central region 552 by a number of set screws 556 that are threadably advanced in screw passages 558 in the joint central region 552. The set screws 556 engage grooves 560 in the joint end caps (554' and 554"), as shown for the joint end cap 554". In the pivot joint 550, the screw passages 558 are inclined to a longitudinal axis 562 by an angle θ which is preferably about 45°.

The joint central region 552 of this embodiment has a pair of central region bearing surfaces 564. Each of the joint end caps 554 has an end cap bearing surface 566. Interposed between the central region bearing surfaces 564 and the end cap bearing surfaces 566 are O-rings 568. When the set screws 556 are advanced in the screw passages 558, the set screws 556 forcibly engage a lead sidewall 570 of the groove 560 and thereby reduce a separation s between the central region bearing surface 564 and the end cap bearing surface 566, compressing the O-ring 568. The torsional load required to rotate the joint end caps 554 relative to the joint central region 552 is proportional to the compression of the O-rings 568, and thus can be adjusted by adjusting the position of the setscrews 556. The pivot joint 550 is also well suited to stringing the wires through the components of the arm before assembly.

Figure 16:
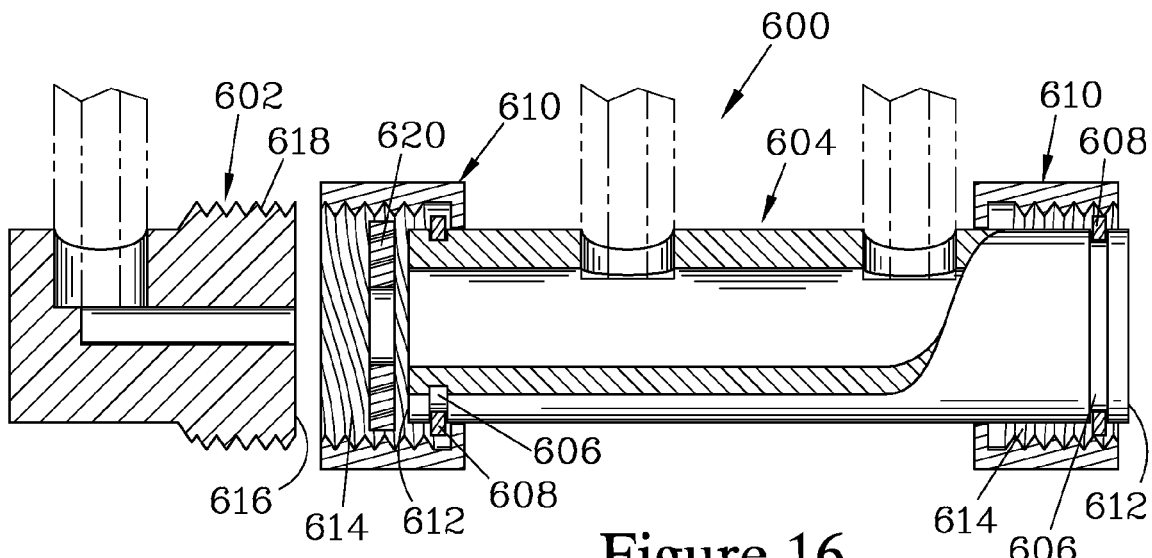
Figure 17:
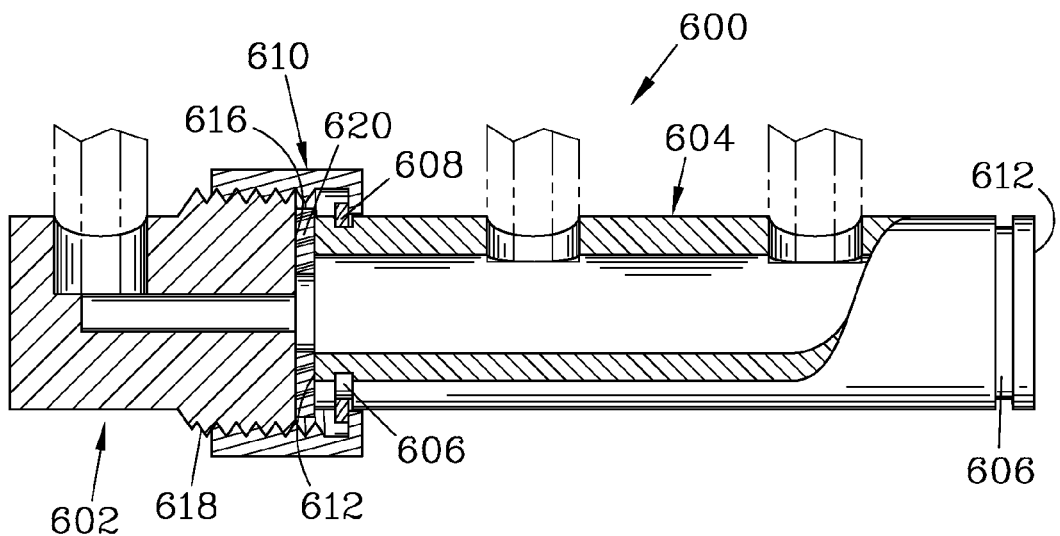

FIGS. 16 and 17 illustrate a pivot joint 600 which provides a different scheme for securing a pair of joint end caps 602 (only one of which is shown) to a joint central region 604. The joint central region 604 has a pair of grooves 606, each configured to accept a retaining clip 608 which is rotatably restrained therein. A pair of joint couplers 610 are provided (only one being shown in FIG. 17), each of the joint couplers 610 slidably and rotatably engaging the joint central region 604 and being retained thereon by one of the retaining clips 608. The joint central region 604 terminates at a pair of central region bearing surfaces 612. The joint couplers 610 each have female screw threads 614.

The joint end cap 602 has an end cap bearing surface 616 and male screw threads 618. The male screw threads 618 are configured to threadably mate with the female screw threads 614 of the joint coupler 610. When so mated, the end cap bearing surface 616 is opposed to one of the central region bearing surfaces 612. A compressible washer 620, shown in FIG. 16 in an uncompressed state, is interposed between the end cap bearing surface 616 and the central region bearing surface 612. As the male screw threads 618 of the joint end cap 602 are threadably advanced in the female screw threads 614 of the joint coupler 610, the joint coupler 610 becomes forcibly engaged with the retaining clip 608, which in turn forcibly engages the groove 606 in which it resides. This forcible engagement allows the compressible washer 620 to be forcibly compressed between the end cap bearing surface 616 and the central region bearing surface 612 to frictionally engage the joint end cap 602 with the joint central region 604, as shown in FIG. 17. The degree of friction between the joint end cap 602 and the joint central region 604 can be adjusted by tightening or loosening the joint coupler 610. This embodiment is also well suited for pre-stringing the parts of the arm before assembly.

Figure 18:
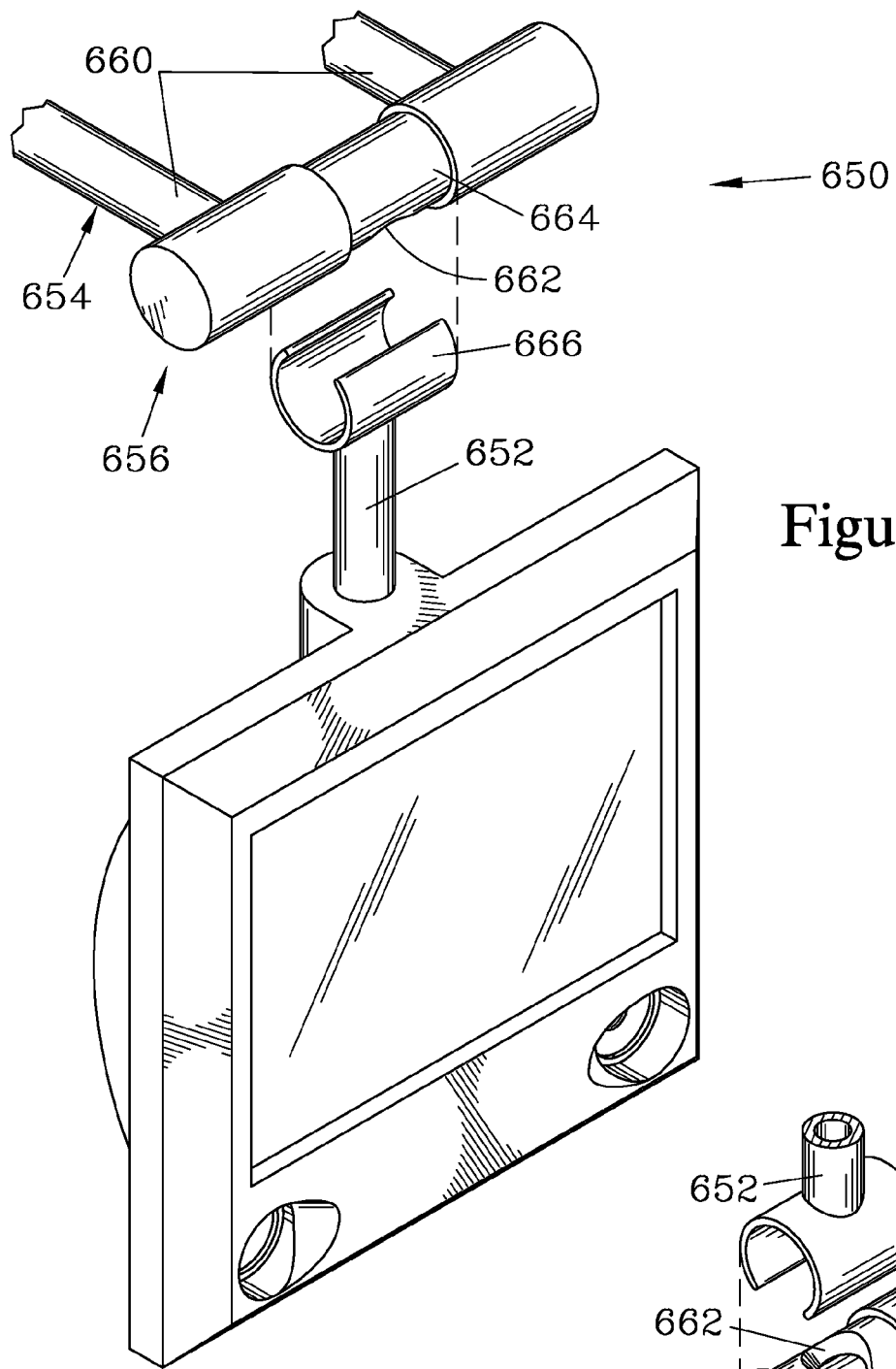
FIGS. 18 and 19 are isometric views that illustrate an alternative joint assembly which can be used for connecting to an arm segment to which a device housing is attached.
Figure 19:
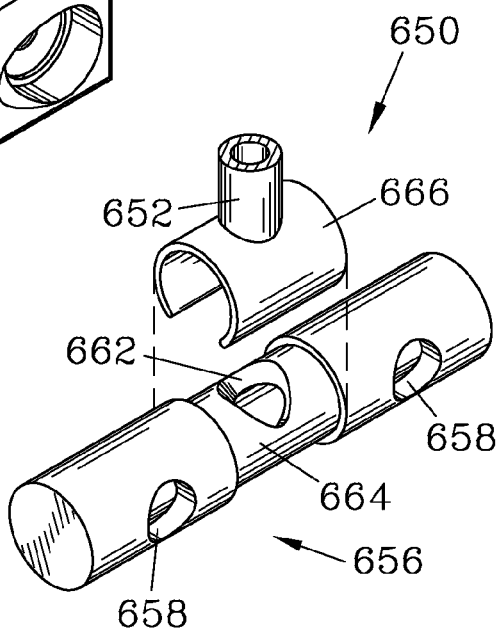

FIGS. 18 and 19 illustrate an alternate pivot joint 650 for connection between an arm fourth segment 652 and an arm third segment 654. In this embodiment, a hollow barrel member 656 serves as one element of the pivot joint 650 and has a pair of spaced apart openings 658 (shown in FIG. 19) for insertion of two arm members 660 that collectively form the arm third segment 654. The hollow barrel member 656 also has a central opening 662 (best shown in FIG. 19) located between the spaced apart openings 658. Preferably, the barrel member 656 has a central portion 664 having a reduced cross section in which the central opening 662 is located. A C-clip 666 snaps onto the barrel member 656 to become frictionally, rotatably engaged therewith. When the barrel member 656 has a central portion 664 having a reduced cross section, the C-clip 666 attaches onto the central portion 664. The C-clip 666 can have a passage therethrough for insertion of the arm fourth segment 652, or could be formed integrally therewith.

While the novel features of the present invention have been described in terms of particular embodiments and preferred applications, it should be appreciated by one skilled in the art that substitution of materials and modification of details can be made without departing from the spirit of the invention.

What I claim is:

1. An adjustable arm for supporting a device housing with respect to a base, the adjustable arm comprising:

an arm first rigid segment that connects to the base and defines an arm first end, said arm first rigid segment having an arm first segment passage therethrough;

an arm second rigid segment having an arm second segment first member and an arm second segment second member which is parallel to and affixed with respect to said arm second segment first member, each of said arm second segment members having an arm second segment passage therethrough;

an arm third rigid segment having an arm third segment first member and an arm third segment second member which is parallel to and affixed with respect to said arm third segment first member, each of said arm third segment members having an arm third segment passage therethrough;

an arm fourth rigid segment that connects to the device housing and defines an arm second end said arm fourth rigid segment having an arm fourth segment passage therethrough;

a first pivot joint which connects said arm first rigid segment to said arm second rigid segment to allow relative pivotable motion therebetween and having a first joint passage that communicates with said arm first segment passage and both of said arm second segment passages;

means for adjusting the torsional load supported by said first pivot joint;

a second pivot joint which connects said arm second rigid segment to said arm third rigid segment to allow relative pivotable motion therebetween, said second pivot joint having, a second joint passage that communicates with both of said arm second segment passages and both of said arm third segment passages, and frictional elements incorporated into said second pivot joint and interposed between said arm second segment members and said arm third segment members;

means for adjusting the torsional load supported by said second pivot joint by varying the force on said frictional elements; and a third pivot joint which connects said arm third rigid segment to said arm fourth rigid segment to allow relative pivotable motion therebetween and having a third joint passage that communicates with both of said arm third segment passages and said arm fourth segment passage.

2. The adjustable arm of claim 1 wherein said second pivot joint further comprises:

a joint central region attached to one of said arm second rigid segment and said arm third rigid segment;

a pair of joint end caps attached to the other of said arm second rigid segment and said arm third rigid segment, said joint central region rotatably engaging said pair of end caps; and a pair of resilient rings providing said frictional elements, each of said resilient rings being positioned between one of said end caps and said joint central region; and further wherein said means for adjusting the torsional load supported by said second pivot joint further comprises:

means for varying the position of each of said pair of joint end caps with respect to said joint central region so as to vary the compression of said resilient ring positioned therebetween.

3. The adjustable arm of claim 2 wherein said arm rigid segments and joint elements are so configured that they can be assembled after being strung onto a power cable and a signal cable.

4. The adjustable arm of claim 3 further comprising:
at least one tension spring operably connected to one of said pivot joints and to one of said arm rigid segments so as to counteract torques on said one of said pivot joints due to weight.

5. The adjustable arm of claim 1 wherein the device housing supported by the adjustable arm houses an audio visual display system that receives power via a power cord and receives signals via at least one signal cable,
the power cord and the at least one signal cable being strung through the adjustable arm from the base to the device housing such that the power cord and the at least one signal cable are each strung through different arm second segment passages and through different arm third segment passages, and
further wherein the device housing is rotatably attached to said arm fourth rigid segment.

6. An adjustable arm for supporting a device housing with respect to a base, the adjustable arm comprising:
an arm first rigid segment that connects to the base and defines an arm first end, said arm first rigid segment having an arm first segment passage therethrough;
an arm second rigid segment, said arm second rigid segment having an arm second segment passage therethrough;
an arm third rigid segment, said arm third rigid segment having an arm third segment passage therethrough;
an arm fourth rigid segment that connects to the device housing and defines an arm second end, said arm fourth rigid segment having an arm fourth segment passage therethrough;
a first pivot joint which connects said arm first rigid segment to said arm second rigid segment to allow relative pivotable motion therebetween, said first pivot joint having a first joint passage that communicates between said arm first segment passage and said arm second passage;
means for adjusting the torsional load supported by said first pivot joint;
a second pivot joint which connects said arm second rigid segment to said arm third rigid segment to allow relative pivotable motion therebetween, said second pivot joint having,
a second joint passage that communicates between said arm second segment passage and said arm third segment passage,
a second joint first element affixed to said arm second rigid segment, and
a second joint second element affixed to said arm third rigid segment, said first and second joint elements being mounted so as to pivot with respect to each other about a common pivot axis;
means for adjusting the torsional load supported by said second pivot joint, having,
a friction element of a resiliently deformable compressible material positioned between said first joint element and said second joint element, and
means for varying the relative positions of said first joint element and said second joint element so as to vary the compression of said friction element, thereby varying the torsional load bearing capacity of said second pivot joint; and
a third pivot joint which connects said arm third rigid segment to said arm fourth rigid segment to allow relative pivotable motion therebetween, said third pivot joint having a third joint passage that communicates between said arm third segment passage and said arm fourth segment passage.

7. The adjustable arm of claim 6 wherein said second joint first element is provided by a pair of joint end caps that rotatably engage said second joint second element, and said arm second rigid segment is formed by a pair of parallel second segment members, each attached to one of said joint end caps and having a second segment member passage therethrough that communicates with said second joint passage, and
further wherein said friction element is provided by a pair of resilient rings, each of said resilient rings being positioned between one of said end caps and said joint central region, and
still further wherein said means for varying the force of engagement of said first joint element and said second joint element with said friction element is provided by means for varying the position of each of said pair of joint end caps with respect to said joint central region so as to vary the compression of said resilient ring positioned therebetween.

8. The pivot joint of claim 7 wherein said arm third rigid segment is formed by a pair of parallel third segment members, each of said third segment members being attached to said second joint second element and having a third segment member passage therethrough that communicates with said second joint passage.

9. The adjustable arm of claim 6 wherein said means for varying the relative positions of said second joint first element and said second joint second element is housed within said first joint element and said second joint element, in combination.

10. The adjustable arm of claim 9 wherein said means for varying the relative positions of said first joint element and said second joint element is provided by at least one adjusting element that is advanced in a direction having a substantially radial component.

11. A pivot joint for an adjustable arm, the pivot joint adjustably connecting together an arm first rigid segment having an arm first passage therethrough and an arm second rigid segment having an arm second passage therethrough, the pivot joint comprising:
a first joint element affixed to the arm first rigid segment;
a second joint element affixed to the arm second rigid segment,
said first and second joint elements being mounted with respect to each other so as to pivot with respect to each other about a common pivot axis and, in combination, forming a joint passage communicating between the arm first passage and the arm second passage,
wherein said second joint element is provided by a pair of joint end caps that rotatably engage said first joint element and the arm second rigid segment is formed by a pair of parallel second segment members, each attached to one of said joint end caps;
a friction element interposed between said first joint element and said second joint element, wherein said friction element is provided by at least one resilient ring of a deformably compressible material positioned between said first joint element and said second joint element,
wherein said at least one resilient ring further comprises:
a first resilient ring positioned between said first cap and said first joint element; and
a second resilient ring positioned between said second cap and said first joint element;
means for varying the force of engagement of said first joint element and said second joint element with said friction element, thereby varying the torsional load bearing capacity of the pivot joint, wherein said means for varying the force of engagement of said first joint element and said second joint element with said friction element is provided by means for varying the position of said second joint element with respect to said first joint element so as to vary the compression of said at least one resilient ring positioned therebetween; and still further wherein the arm second passage is formed by a second segment member passage through each of the second segment members, each of the second segment member passages communicating with said joint passage.

12. A pivot joint for an adjustable arm, the pivot joint adjustably connecting together an arm first rigid segment having an arm first passage therethrough and an arm second rigid segment having an arm second passage therethrough, the pivot joint comprising:

a first joint element affixed to the arm first rigid segment;

a second joint element affixed to the arm second rigid segment, said first and second joint elements being mounted with respect to each other so as to pivot with respect to each other about a common pivot axis and, in combination, forming a joint passage communicating between the arm first passage and the arm second passage;

a friction element interposed between said first joint element and said second joint element, wherein said friction element is provided by at least one resilient ring of a deformably compressible material positioned between said first joint element and said second joint element; and means for varying the force of engagement of said first joint element and said second joint element with said friction element, thereby varying the torsional load bearing capacity of the pivot joint, wherein said means for varying the force of engagement of said first joint element and said second joint element with said friction element is provided by means for varying the position of said second joint element with respect to said first joint element so as to vary the compression of said at least one resilient ring positioned therebetween;

at least one insert portion on one of said first joint element and said second joint element sized to slidably and rotatably engage a joint element passage in the other of said first joint element and said second joint element, said at least one insert portion extending through said at least one resilient ring;

opposed bearing surfaces on said first joint element and said second joint element associated with each of said insert portions and configured to engage said one of said resilient rings so as to compress said resilient ring as said insert portion is slidably advanced into said joint element passage; and means for retaining each of said insert portions in said joint element passage when advanced therein a sufficient distance to compress said resilient ring.

13. The pivot joint of claim 11 wherein the arm second rigid segment is formed by a pair of parallel second segment members and the arm second passage is formed by a second segment member passage through each of the second segment members, each of the second segment member passages communicating with said joint passage.

14. The pivot joint of claim 12 wherein said means for retaining each of said insert portions in said at least one central passage further comprises:

a securing groove formed on each of said insert portions; and a plurality of radially arranged set screws mounted with respect to said central passage so as to be threadably advancable in a radially inward direction so as to be brought into contact with said securing groove to retain said insert portion in said central passage while allowing rotation of said insert portion relative to said joint element passage.

15. The pivot joint of claim 14 wherein said set screws are advanced along an inclined path and forcibly engage said insert portion so as to reduce the separation between said opposed bearing surfaces when advanced.

16. The pivot joint of claim 12 wherein said means for varying the force of engagement of said first joint element and said second joint element with said friction element is provided by at least one adjusting element that is advanced in a direction having a substantially radial component.

* * * * *